US012713159B2

(12) United States Patent
Shimada et al.

(10) Patent No.: US 12,713,159 B2
(45) Date of Patent: Aug. 18, 2026

(54) PHOTOELECTRIC CONVERSION APPARATUS, DEVICE, AND SIGNAL PROCESSING METHOD

(71) Applicant: CANON KABUSHIKI KAISHA, Tokyo (JP)

(72) Inventors: Atsushi Shimada, Kanagawa (JP); Noriyuki Shikina, Tokyo (JP); Yoshiko Shigiya, Tokyo (JP); Shinya Igarashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 43 days.

(21) Appl. No.: 18/824,205

(22) Filed: Sep. 4, 2024

(65) Prior Publication Data

US 2025/0088773 A1 Mar. 13, 2025

(30) Foreign Application Priority Data

Sep. 7, 2023 (JP) ................................ 2023-145294

(51) Int. Cl.
*H04N 25/779* (2023.01)
*H04N 25/40* (2023.01)

(52) U.S. Cl.
CPC ........... *H04N 25/779* (2023.01); *H04N 25/40* (2023.01)

(58) Field of Classification Search
CPC ...... H04N 25/779; H04N 25/78; H04N 25/46; H04N 25/40; H04N 25/47; H04N 25/76
See application file for complete search history.

(56) References Cited

U.S. PATENT DOCUMENTS

2009/0040149 A1 2/2009 Nishinohara
2018/0316881 A1* 11/2018 Arishima ............ H04N 25/779
2023/0199347 A1* 6/2023 Kato ..................... H04N 25/77 348/207.99
2024/0121528 A1* 4/2024 Kito ...................... H04N 25/78

FOREIGN PATENT DOCUMENTS

JP 2005191814 A 7/2005
JP 2006229798 A 8/2006
JP 2009048061 A 3/2009
WO 2015151793 A1 10/2015

* cited by examiner

*Primary Examiner* — Kelly L Jerabek
(74) *Attorney, Agent, or Firm* — Canon U.S.A., Inc. IP Division

(57) ABSTRACT

A photoelectric conversion apparatus includes a plurality of pixels, a plurality of signal lines, and a scanning unit configured to scan the plurality of pixels. The scanning unit performs scanning to connect two or more pixels arranged in a predetermined number of pixel rows, the predetermined number of which is two or more, to one of the plurality of signal lines during a scanning period. The scanning unit performs reading a first pixel row group having a first number of rows during a first period. The scanning unit performs reading a second pixel row group having a second number of rows less than the first number of rows and reading a third pixel row group having a third number of rows less than the first number of rows during a second period in which a first or last scan is performed in the scanning period.

20 Claims, 14 Drawing Sheets

1
101
CPU
102
CONTROL UNIT
103
VERTICAL SCANNING UNIT
104
PIXEL UNIT
105
P(1,1)
P(m,1)
P(1,n)
P(m,n)
106
Q(1,n+1)
Q(m,n+1)
Q(1,n+k)
Q(m,n+k)
107
HORIZONTAL TRANSFER UNIT
108
SIGNAL OUTPUT UNIT

VERTICAL SYNCHRONIZATION SIGNAL VD
HORIZONTAL SYNCHRONIZATION SIGNAL HD
T1
T1-1
T1-2
TIME T
T1-3
T1-4
T2
PIXEL
ROW NUMBER
VERTICAL LINE
EFFECTIVE
INEFFECTIVE
1 cr_vl1
2 cr_vl2
3 cr_vl1
4 cr_vl2
5 cr_vl1
6 cr_vl2
7 cr_vl1
8 cr_vl2
n-2 cr_vl1
n-1 cr_vl2
n cr_vl1
n+1 cr_vl2
n+2 cr_vl2
READ OPERATION
READ OPERATION
PIXEL ROW

VERTICAL SYNCHRONIZATION SIGNAL VD
HORIZONTAL SYNCHRONIZATION SIGNAL HD
TIME T
T1
T1-1
T1-2
T1-3
T1-4
T2
PIXEL
ROW NUMBER
VERTICAL LINE
EFFECTIVE
INEFFECTIVE
1 cr_vl1
2 cr_vl2
3 cr_vl1
4 cr_vl2
5 cr_vl1
6 cr_vl2
7 cr_vl1
8 cr_vl2
9 cr_vl1
10 cr_vl2
n-2 cr_vl1
n-1 cr_vl2
n cr_vl1
n+1 cr_vl2
n+2 cr_vl2
READ OPERATION
READ OPERATION
PIXEL ROW

VERTICAL SYNCHRONIZATION SIGNAL VD
HORIZONTAL SYNCHRONIZATION SIGNAL HD
TIME T
T1
T1-1
T1-2
T1-3
T1-4
T2
PIXEL
ROW NUMBER
VERTICAL LINE
EFFECTIVE
INEFFECTIVE
1 cr_vl1
2 cr_vl2
3 cr_vl1
4 cr_vl2
5 cr_vl1
6 cr_vl2
7 cr_vl1
8 cr_vl2
9 cr_vl1
10 cr_vl2
11 cr_vl1
12 cr_vl2
n-2 cr_vl1
n-1 cr_vl2
n cr_vl1
n+1 cr_vl2
n+2 cr_vl2
READ OPERATION
READ OPERATION
PIXEL ROW

VERTICAL SYNCHRONIZATION SIGNAL VD
HORIZONTAL SYNCHRONIZATION SIGNAL HD
PIXEL
ROW NUMBER
VERTICAL LINE
EFFECTIVE
INEFFECTIVE
TIME T
T1
T1-1
T1-2
T1-3
T1-4
T2
READ OPERATION
PIXEL ROW 104
105
502
P(1, 1)
P(2, 1)
P(m, 1)
P(1, n)
P(2, n)
P(m, n)
c1_vl1
c2_vl2
c1_vl3
c2_vl4
cm_vl1
cm_vl2
cm_vl3
cm_vl4
Q(1, n+1)
Q(1, n+k)
Q(m, n+k)
107
HORIZONTAL TRANSFER UNIT

T1
T1-1
T1-2
T1-3
TIME T
T2
VERTICAL SYNCHRONIZATION SIGNAL VD
HORIZONTAL SYNCHRONIZATION SIGNAL HD
PIXEL
ROW NUMBER
SELECTION TRANSISTOR
PD
VERTICAL LINE
EFFECTIVE
INEFFECTIVE
PS EL2
PD 1
PD 2
cr_vl1
cr_vl2
cr_vl3
cr_vl4
PIXEL ROW

PHOTOELECTRIC CONVERSION APPARATUS, DEVICE, AND SIGNAL PROCESSING METHOD

BACKGROUND

Technical Field

The aspect of the embodiments relates to a photoelectric conversion apparatus, a device, and a signal processing method.

Description of the Related Art

There is a technique used in imaging apparatuses, such as digital cameras equipped with a complementary metal oxide semiconductor (CMOS) image sensor, which is an XY address type imaging device, to read signals in parallel through a plurality of signal lines provided to one pixel row, to read signals from the pixel area at high speed.

International Publication No. 2015/151793 discloses a solid-state imaging device providing small differences between voltages of signals with the signal lines out of use in reading always fixed to a constant voltage to read a signal from a pixel through a part of a plurality of signal lines.

International Publication No. 2015/151793 does not disclose a case in which the number of pixel rows to be read in parallel is less than the number of signal lines used in reading to read the end address of a scanning area. In this case, the signal lines to which signals are not output from pixels are floating. A change in the number of floating signal lines causes fluctuation in voltage level of signal lines from which signals from pixels are read, resulting in deteriorated image quality.

SUMMARY

According to an aspect of the embodiments, an apparatus includes a plurality of pixels arranged in an array and having a scanning area to be sequentially scanned in a predetermined direction, a plurality of signal lines configured to extend in a column direction and to be provided in each pixel column, and a scanning unit configured to scan the plurality of pixels. The scanning unit performs scanning to connect two or more pixels arranged in a predetermined number of pixel rows, the predetermined number of which is two or more, among the plurality of pixels to one of the plurality of signal lines in parallel during a scanning period in which the scanning area is scanned. The scanning unit performs reading a first pixel row group having a first number of rows in the scanning area during a first period included in the scanning period. The scanning unit performs reading a second pixel row group having a second number of rows less than the first number of rows and reading a third pixel row group having a third number of rows less than the first number of rows in parallel in the scanning area during a second period in which a first or last scan is performed in the scanning period.

Further features of the disclosure will become apparent from the following description of exemplary embodiments with reference to the attached drawings.

DESCRIPTION OF THE EMBODIMENTS

In exemplary embodiments described below, a solid-state imaging device will be mainly described as an example of a photoelectric conversion apparatus. However, each exemplary embodiment is not limited to a solid-state imaging device and can also be applied to another example of a photoelectric conversion apparatus. Examples include a ranging apparatus (an apparatus that measures a distance using a focus detection and time of flight (TOF)) and a photometric apparatus (an apparatus that measures an amount of incident light).

The disclosure of the present specification includes complements of concepts described in the present specification. More specifically, if the present specification includes a description to the effect that, for example, "A is greater than B", even if a description to the effect that "A is not greater than B" is omitted, it can be said that the present specification still describes that "A is not greater than B". This is because the description that "A is greater than B" is on the assumption of taking into account a case where "A is not greater than B".

Figure 1:
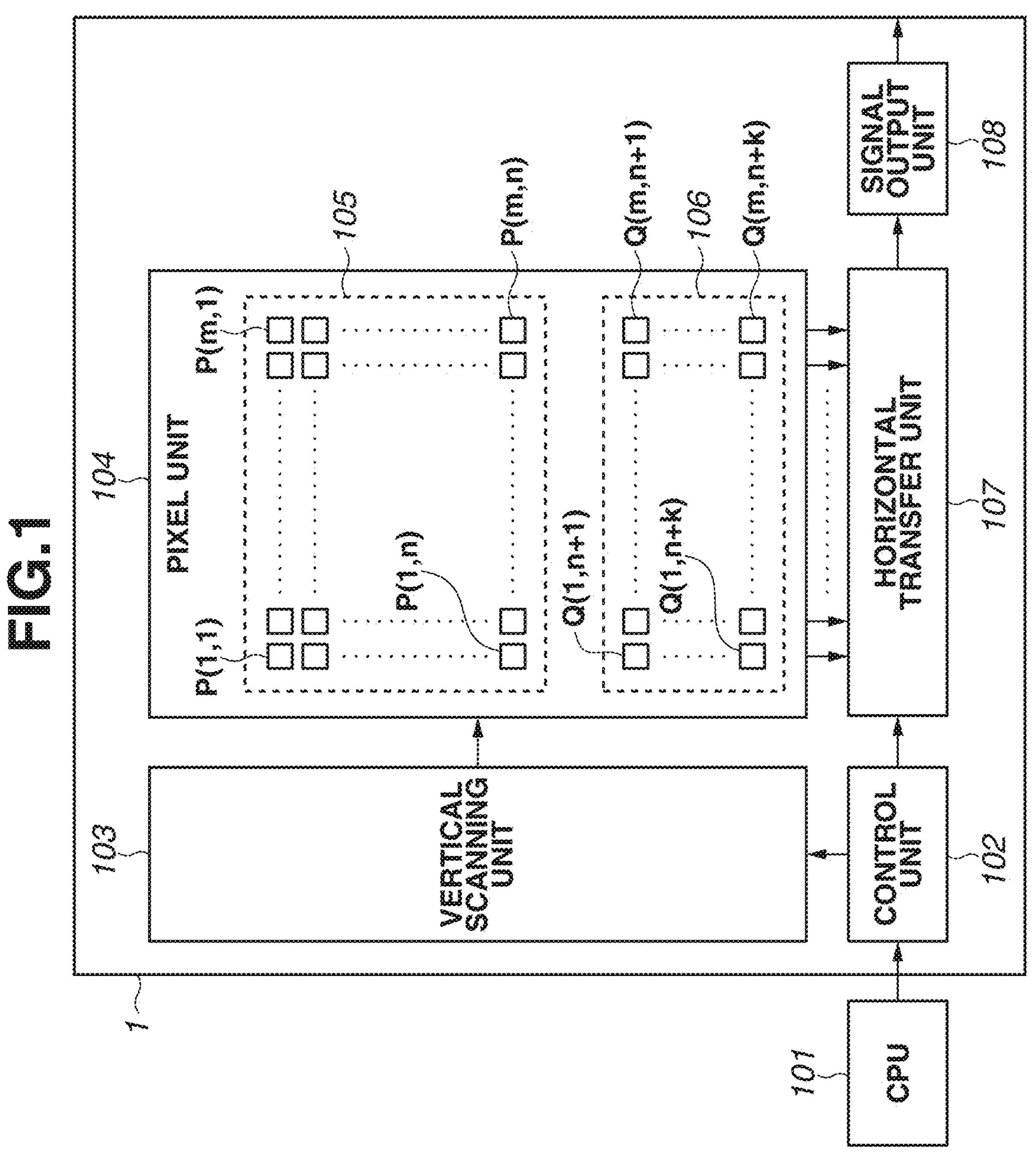
FIG. 1 is a block diagram illustrating an example of the configuration of a solid-state imaging device according to a first exemplary embodiment.

FIG. 1 is a block diagram illustrating an example of the configuration of a solid-state imaging device according to a first exemplary embodiment.

A solid-state imaging device 1 is controlled by a central processing unit (CPU) 101. The CPU 101 can be provided in the solid-state imaging device 1 or in an imaging system in which the solid-state imaging device 1 is mounted, that is, outside the solid-state imaging device 1.

A control unit 102 receives a control signal, such as a synchronization signal, and a setting signal, such as an operation mode, from the CPU 101, and outputs a control signal to a vertical scanning unit 103 and a horizontal transfer unit 107.

The vertical scanning unit 103 receives the control signal from the control unit 102 and performs a read operation on a pixel area 104. The read operation refers to an operation in which the vertical scanning unit 103 scans a part or all of the pixel rows of the pixel area 104 in a predetermined direction and sequentially outputs signals based on charges accumulated in the photoelectric conversion elements in the pixels of the pixel area 104. Hereinbelow, the area as the target on which a read operation is performed is referred to as a scanning area.

The pixel area 104 in which pixels are arranged in an array includes a first pixel region 105 and a second pixel region 106. The first pixel region 105 includes a plurality of unit pixels P(1, 1) to P(m, n) arranged in rows and columns, namely n rows and m columns. Here, a row direction and a column direction respectively indicate a horizontal direction and a vertical direction in the drawings. Subscripts in parentheses of the unit pixel P(m, n) respectively indicate a column number and a row number. In addition, the row number of the leading row is the first row, and the column number of the leading column is the first column.

Each of the plurality of unit pixels P includes a photoelectric conversion unit including a photoelectric conversion element, such as a photodiode, and outputs a pixel signal corresponding to an amount of incident light. The first pixel region 105 can include an effective pixel that outputs a pixel signal corresponding to an amount of incident light, as well as an optical black pixel in which the photoelectric conversion unit is shielded from light and a dummy pixel that does not output a signal.

The second pixel region 106 includes a plurality of null pixels Q(1, n+1) to Q(m, n+k) in k rows and m columns and is arranged in different rows in the same columns as the columns in which the plurality of unit pixels P forming the first pixel region 105 is arranged. Each of the plurality of null pixels Q does not include a photoelectric conversion unit and outputs a pixel signal of a predetermined value corresponding to an applied voltage.

The numbers of rows and columns of the pixels P arranged in the first pixel region 105 and the pixels Q arranged in the second pixel region 106 are not particularly limited.

The horizontal transfer unit 107 receives the control signal from the control unit 102 and transfers a signal read from the pixel area 104 to a signal output unit 108.

The signal output unit 108 includes, for example, a digital processing unit, a parallel-serial conversion circuit, and an output circuit, such as a low voltage differential signaling (LVDS) circuit. The signal output unit 108 performs digital processing on the signal transferred from the horizontal transfer unit 107 and outputs the processed signal as serial data to the outside of the solid-state imaging device 1.

Figure 2:
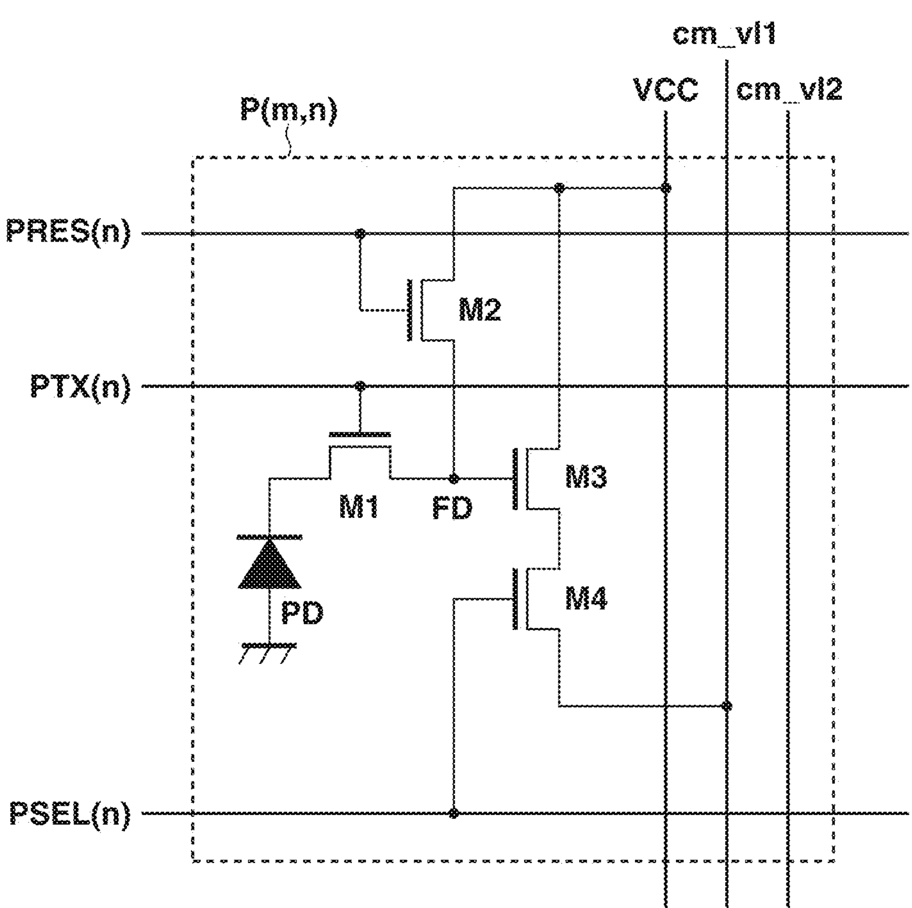
FIG. 2 illustrates an example of the configuration of a pixel according to the first exemplary embodiment.

FIG. 2 illustrates an example of the configuration of each pixel P arranged in the first pixel region 105.

In FIG. 2, the pixel P(m, n) represents the pixel arranged in the n-th row and m-th column of the pixel area 104. Each pixel P includes a photodiode (hereinbelow, referred to as "PD"), a floating diffusion (hereinbelow, referred to as "FD"), a transfer transistor M1, a reset transistor M2, an amplification transistor M3, and a selection transistor M4.

The PD is a photoelectric conversion element that performs a photoelectric conversion to generate and accumulate a charge corresponding to incident light. The transfer transistor M1 transfers the charge from the PD to the FD, which is an input node of the amplification transistor M3. The FD stores the charge transferred via the transfer transistor M1.

The reset transistor M2 resets the voltage of the FD to a predetermined voltage. A signal based on the potential of the FD which varies depending on the transferred charge, is amplified by the amplification transistor M3.

The amplified signal is output to one of the two vertical signal lines cm_vl1 and cm_vl2 in the m-th column via the selection transistor M4.

The drains of the reset transistor M2 and the amplification transistor M3 are electrically connected to a pixel power supply VCC. The source of the amplification transistor M3 is electrically connected to an electric current source (not illustrated) via the selection transistor M4 and the signal line cm_vl1 or cm_vl2 and operates as a source follower circuit. In other words, the amplification transistor M3 can output a signal corresponding to the potential of the FD connected to its gate terminal. The signal lines cm_vl1 and cm_vl2 to which a signal is output from the pixel are also referred to as vertical signal lines.

Each transistor included in the unit pixel P can be an N-channel transistor or a P-channel transistor.

A signal PTX(n) is a signal for controlling the transfer transistor M1 in the n-th row and is input to the gate of the transfer transistor M1. A signal PRES(n) is a signal for controlling the reset transistor M2 in the n-th row and is input to the gate of the reset transistor M2. A signal PSEL(n) is a signal for controlling the selection transistor M4 in the n-th row and is input to the gate of the selection transistor M4. Each transistor is in a conductive state with a signal input to the gate at a high level and in a non-conductive state with a signal input to the gate at a low level.

When the pixel P is read, noise (N) data is read, and then signal (S) data is read. After the reset of the FD is released, the N data is read by the charge of the FD being read via the amplification transistor M3 through a control of the gate voltage of the selection transistor M4. After the N data is read, the S data is read by the charge of the FD when the charge of the PD is transferred to the FD through the transfer transistor M1 being read via the amplification transistor M3 through a control of the gate voltage of the selection transistor M4. The reset noise of the FD can be removed through correlated double sampling processing (S data−N data) as the data on pixel P.

Figure 3:
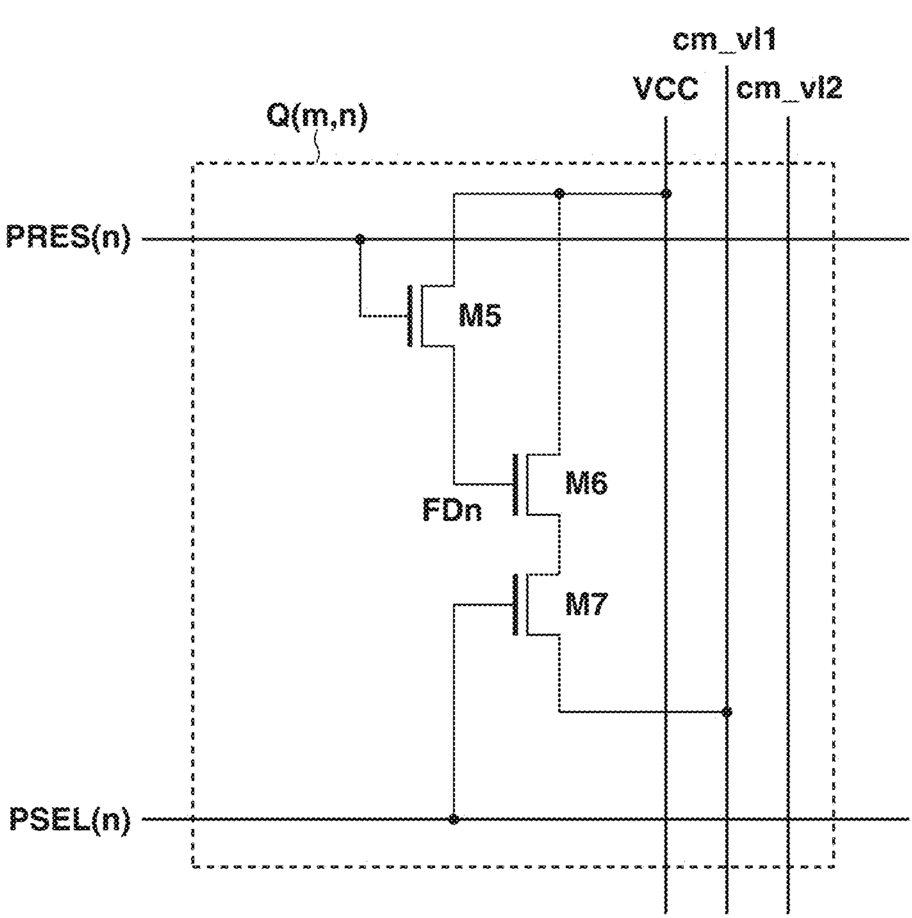
FIG. 3 illustrates an example of the configuration of a pixel according to the first exemplary embodiment.

FIG. 3 illustrates an example of the configuration of each null pixel Q arranged in the second pixel region 106.

Each null pixel Q includes a floating diffusion (hereinbelow, referred to as "FDn"), a reset transistor M5, an amplification transistor M6, and a selection transistor M7. A null pixel Q is different from a unit pixel P in that the null pixel Q does not include a PD and a transfer transistor M1. Other than that, the null pixel Q has the same configuration as the unit pixel P.

The reset transistor M5 resets the voltage of the FDn to a predetermined voltage. The amplification transistor M6 outputs a signal based on the potential of the FDn which varies depending on the transferred charge to one of the two signal lines cm_vl1 and cm_vl2 in the m-th column via the selection transistor M7.

The drains of the reset transistor M5 and the amplification transistor M6 are electrically connected to the pixel power supply VCC. The source of the amplification transistor M6 is electrically connected to an electric current source (not illustrated) via the selection transistor M7 and the signal line cm_vl1 or cm_vl2 and operates as a source follower circuit. In other words, the amplification transistor M6 can output a signal corresponding to the potential of the FDn connected to its gate terminal.

Each transistor included in the null pixel Q can be an N-channel transistor or a P-channel transistor.

The signal PRES(n) is a signal for controlling the reset transistor M5 in the n-th row and is input to the gate of the reset transistor M5. The signal PSEL(n) is a signal for controlling the selection transistor M7 in the n-th row and is input to the gate of the selection transistor M7.

As described above, the reset transistor M5, the amplification transistor M6, and the selection transistor M7 of the null pixel Q have the same configurations as the reset transistor M2, the amplification transistor M3, and the selection transistor M4 of the unit pixel P, respectively. Thus, an N signal excluding the effects of the photoelectric conversion element PD and the transfer transistor M1 from an N signal of the unit pixel P is read from the null pixel Q.

Figure 4:
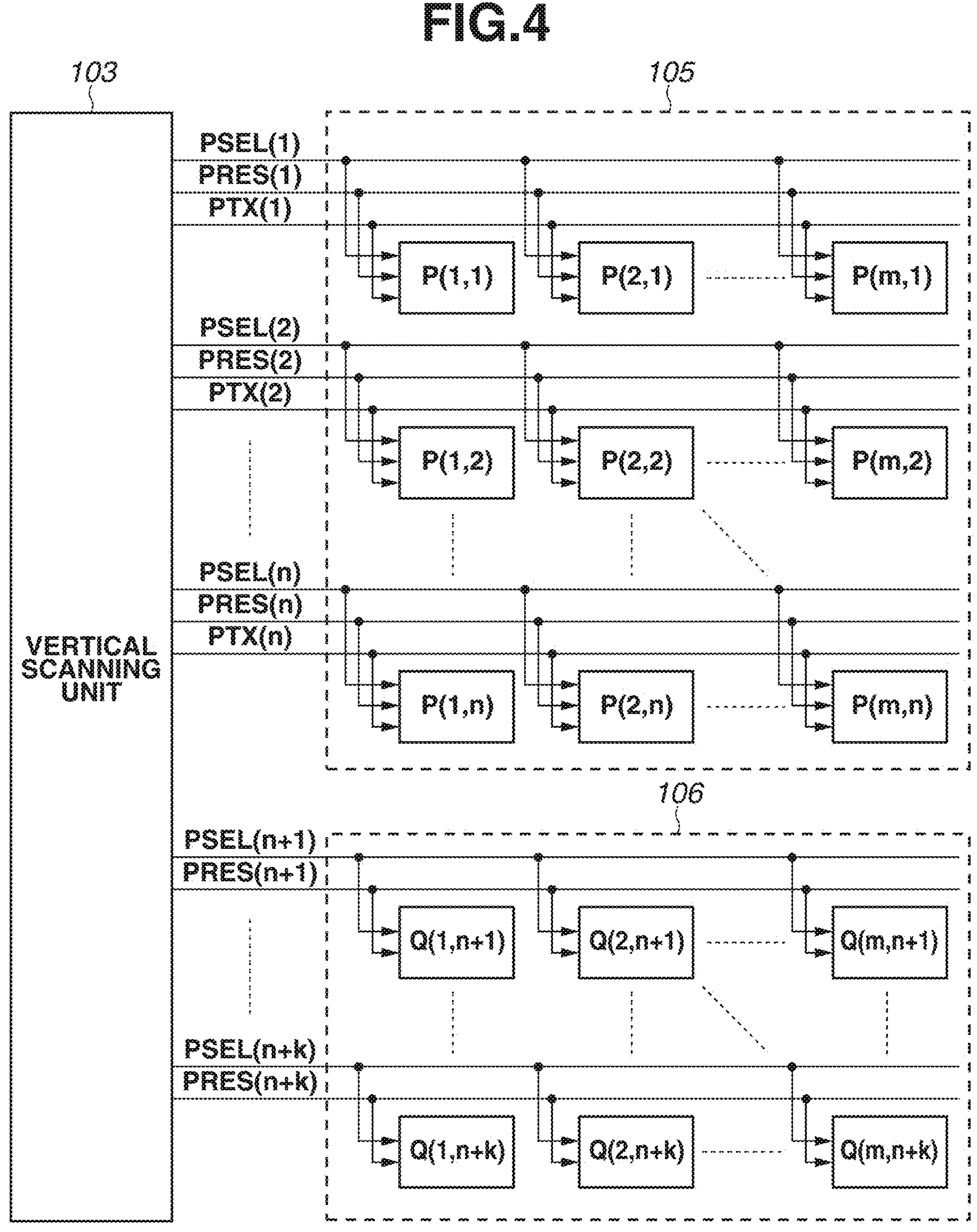
FIG. 4 is a schematic diagram illustrating an example of the configuration of a vertical scanning unit and a pixel area according to the first exemplary embodiment.

FIG. 4 is a schematic diagram illustrating an example of the configuration of the vertical scanning unit and the pixel area according to the present exemplary embodiment.

The vertical scanning unit 103 outputs signals PTX, PRES, and PSEL. Signals PTX(s), PRES(s), and PSEL(s) (s: 1 to n) are input to the pixel P(m, s) (s: 1 to n) arranged in the s-th row in the first pixel region 105.

Similarly, the signals PRES(s) and PSEL(s) (s: n+1 to n+k) are input to the null pixel Q(m, s) (s: n+1 to n+k) arranged in the s-th row in the second pixel region 106.

Thus, the read operation can be performed on the pixels P in the first to n-th rows and the null pixels Q in the (n+1)-th to (n+k)-th rows.

Figure 5:
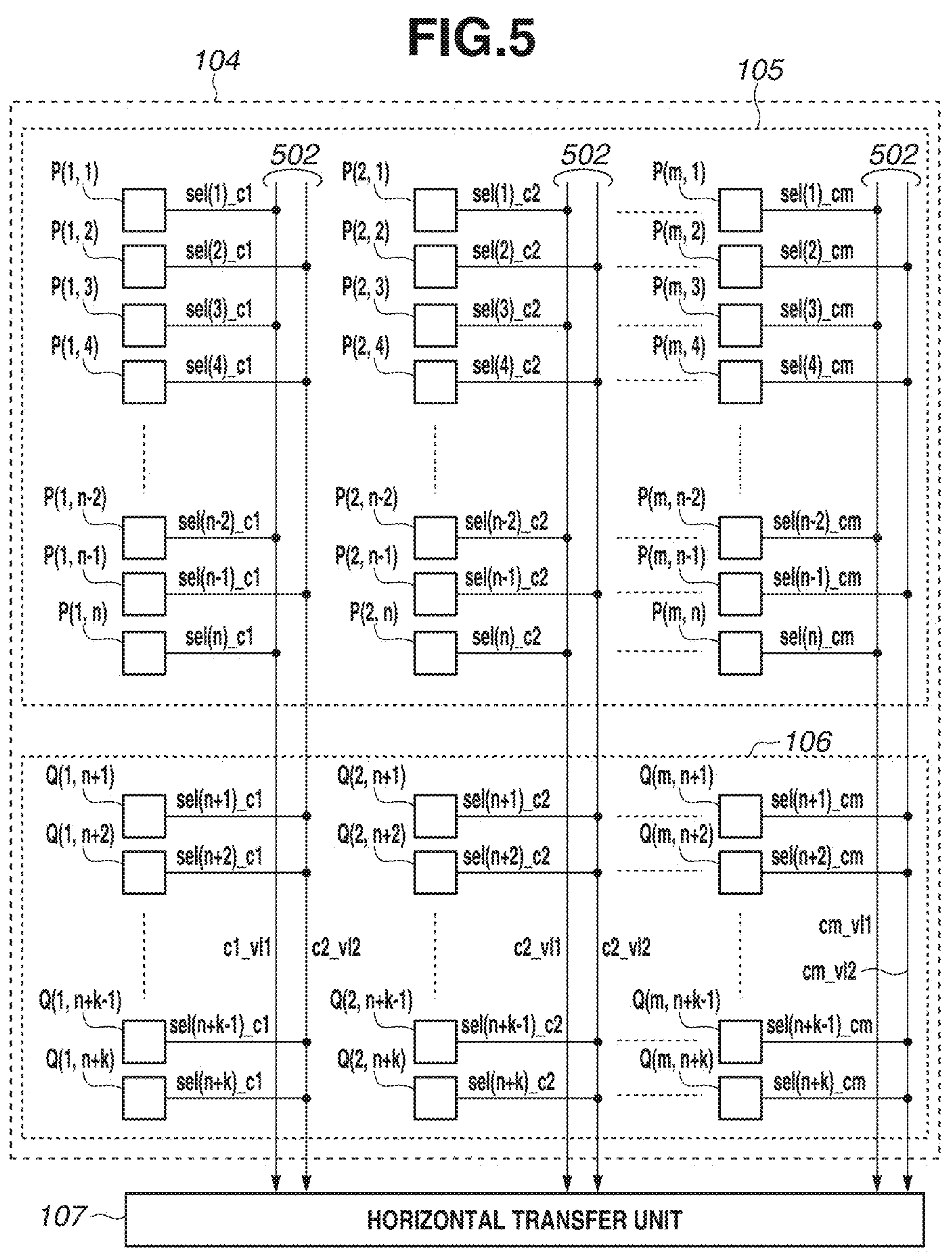
FIG. 5 is a schematic diagram illustrating an example of the configuration of a pixel area and a horizontal transfer unit according to the first exemplary embodiment.

FIG. 5 is a schematic diagram illustrating an example of the configuration of the pixel area and the horizontal transfer unit according to the present exemplary embodiment.

A plurality of signal lines 502 is provided to each column of pixels included in the pixel area 104. The signal lines 502 extend in the column direction. The first pixel region 105 includes pixels P in each column. Further, the pixels P in each column is connected to the signal lines 502. The second pixel region 106 includes null pixels Q in each column. Further, the null pixels Q in each column is connected to the signal lines 502.

In other words, each pixel in the pixel area 104 is connected via its selection transistor to one of the signal lines 502 arranged in each pixel column at a predetermined row cycle.

The selection transistor M4 provided in the pixel P(r, s) in the r-th column and the s-th row (r: 1 to m, s: 1 to n) is connected to a signal line 502 via a signal line sel(s)_cr. Further, the selection transistor M7 provided in the null pixel Q(r, s) in the r-th column and the s-th row (r: 1 to m, s: n+1 to n+k) is connected to a signal line 502 via the signal line sel(s)_cr. The signal lines 502 are connected to a constant electric current source (not illustrated). Further, the signal lines 502 are connected to the horizontal transfer unit 107.

In the following in the present exemplary embodiment, an example will be described in which two signal lines 502 are arranged for each column, but the number of signal lines 502 per column is not limited to this example. In FIG. 5, the two signal lines 502 connected to the pixels in the first column are represented as signal lines cl_vl1 and cl_vl2. Similarly, the two signal lines 502 connected to the pixels in the r-th column are represented as signal lines cr_vl1 and cr_vl2.

The unit pixels P, the signal line sel(s)_cr, and the signal lines cr_vl1 and cr_vl2 in each row in the first pixel region 105 are connected as follows.

The pixel P(r, 1) in the first row is connected to the signal line cr_vl1 via a signal line sel(1)_cr. The pixel P(r, 2) in the second row is connected to the signal line cr_vl2 via a signal line sel(2)_cr. Similarly, the pixels P in the odd-numbered rows are connected to the signal line cr_vl1 via the signal lines sel(1)_cr, and the pixels P in the even-numbered rows are connected to the signal line cr_vl2 via the signal lines sel(2)_cr. This connection is an example, and the pixels can be connected at an arbitrary cycle as appropriate.

The null pixels Q in each row in the second pixel region 106 are all connected to the signal line cr_vl2 via the signal lines sel(s)_cr. This connection is an example, and it is unnecessary that all the null pixels Q in each row are connected to the signal line cr_vl2, but it is sufficient that the null pixels Q are connected to either the signal line cr_vl1 or cr_vl2 in each row.

Figure 6:
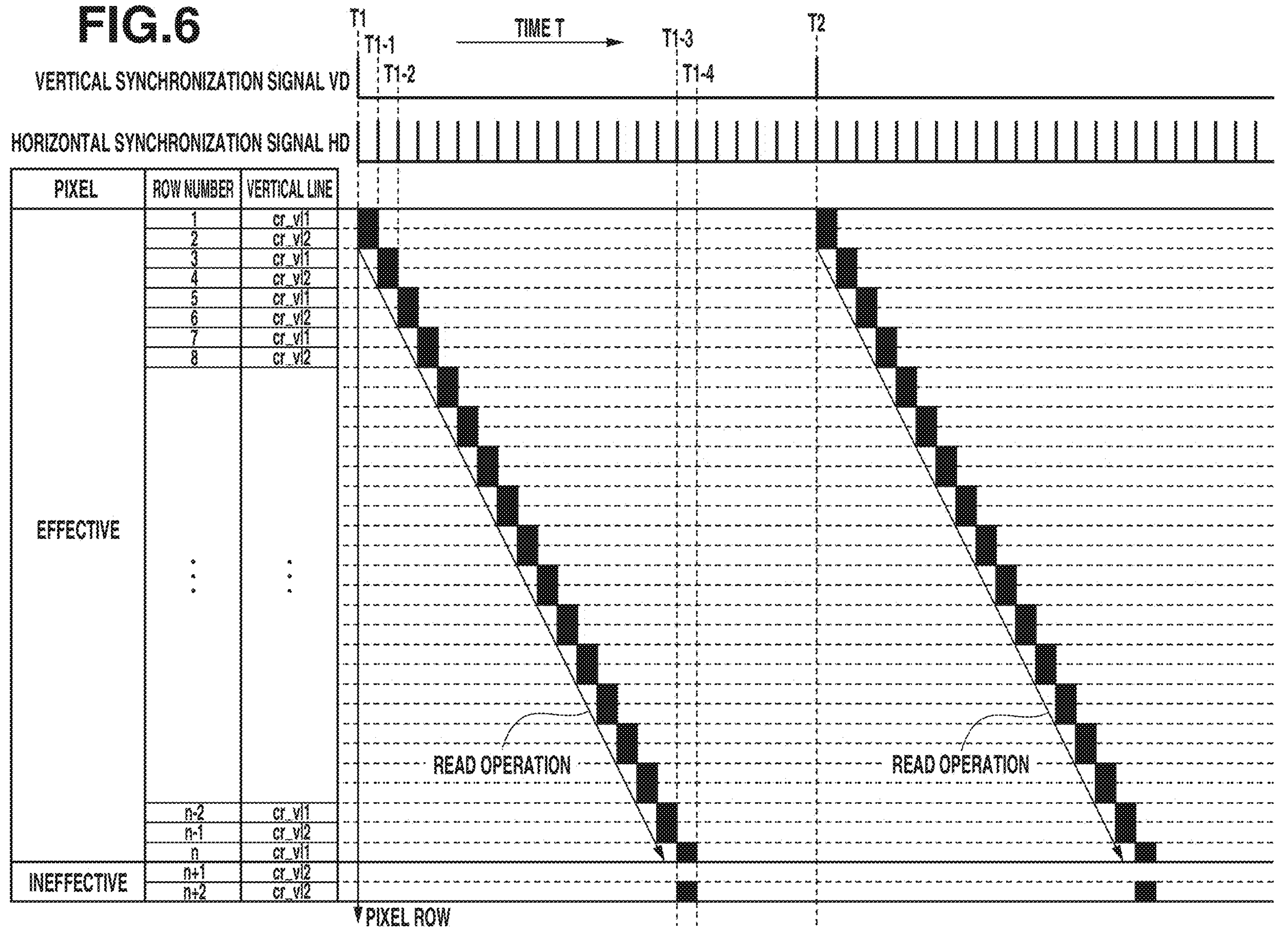
FIG. 6 is a timing chart illustrating an example of an operation according to the first exemplary embodiment.

FIG. 6 is a timing chart illustrating an example of an operation of the solid-state imaging device 1 according to the present exemplary embodiment.

According to the present exemplary embodiment, image data is acquired through the scanning of the first to n-th rows (n: a natural number greater than or equal to 1) in a first vertical scan.

The read operation is started at time T. During the period from time T to time T1−1, the charges of the PDs are read from the pixels P arranged in the first and second rows. At that time, the vertical scanning unit 103 controls the signals PTX(s), PRES(s), and PSEL(s) (s: 1 to 2) to perform the read operation from the selection transistor M4 of each pixel P, and the read signal from each pixel is read via the signal line sel(s)_r (s: 1 to 2, r: 1 to m), i.e., the pixel signal of the first row being read from the signal line cr_vl1, the pixel signal of the second row being read from the signal line cr_vl2.

Next, during the period from time T1−1 to time T1−2, the charges of the PDs of the pixels P in the third and fourth rows are read respectively from the two signal lines arranged in each column. At that time, the vertical scanning unit 103 controls the signals PTX(s), PRES(s), and PSEL(s) (s: 3 to 4) to perform the read operation from the selection transistor M4 of each pixel P, and the read signal from each pixel is read via the signal line sel(s)_r (s: 3 to 4, r: 1 to m), i.e., the pixel signal of the third row being read from the signal line cr_vl1, the pixel signal of the fourth row being read from the signal line cr_vl2. Subsequently, the read operation is performed by sequentially scanning two rows at a time in synchronization with horizontal synchronization signals HD until time T1−3.

During the period from time T1−3 to time T1−4, pixel signals from the pixels P in the n-th row and the null pixel Q in the (n+2)-th row are read from the two signal lines, respectively. At that time, the vertical scanning unit 103 controls the signals PTX(s), PRES(s), and PSEL(s) (s: n, n+2) to perform the read operation from the selection transistor M4 of each pixel P and from the selection transistor M7 of each null pixel Q, and the read signal from each pixel is read via the signal line sel(s)_r (s: n, n+2, r: 1 to m), i.e., the pixel signal of the n-th row being read from the signal line cr_vl1, the pixel signal of the (n+2)-th row being read from the signal line cr_vl2.

In other words, the vertical scanning unit 103 performs following operations. During a certain period (first period) in a scanning period, the vertical scanning unit 103 performs a read operation on a first pixel row group having a certain number of rows (first number of rows) in the scanning area. Further, during a period (second period) in which the last scan is performed in the scanning period, the vertical scanning unit 103 performs a read operation in parallel on a second pixel row group having the number of rows (second number of rows) less than the first number of rows and on a third pixel row group having the number of rows (third number of rows) less than the first number of rows in the scanning area.

As described below according to another exemplary embodiment, the second period can be a period during which the first scan is performed in the scanning period. In addition, the third pixel row group can be selected from the first pixel region 105.

According to the present exemplary embodiment, the null pixels Q are read from the (n+2)-th row, but they can also be read from the (n+1)-th row. In other words, a pixel row can be present between the second pixel row group and the third pixel row group as in the present exemplary embodiment or not.

If the null pixel signals in the (n+2)-th row are not read at the same time when the pixel signals in the n-th row are read, the signal line cr_vl2 is floating, and the voltage level of a vertical signal line cr_vl1 used in reading varies, affecting the pixel signals of n-th pixels.

The configuration described in the present exemplary embodiment allows reading with a signal line or signal lines not being floating while reading all the pixels in the scanning area when read periods of a predetermined number of pixel rows overlap.

Figure 7:
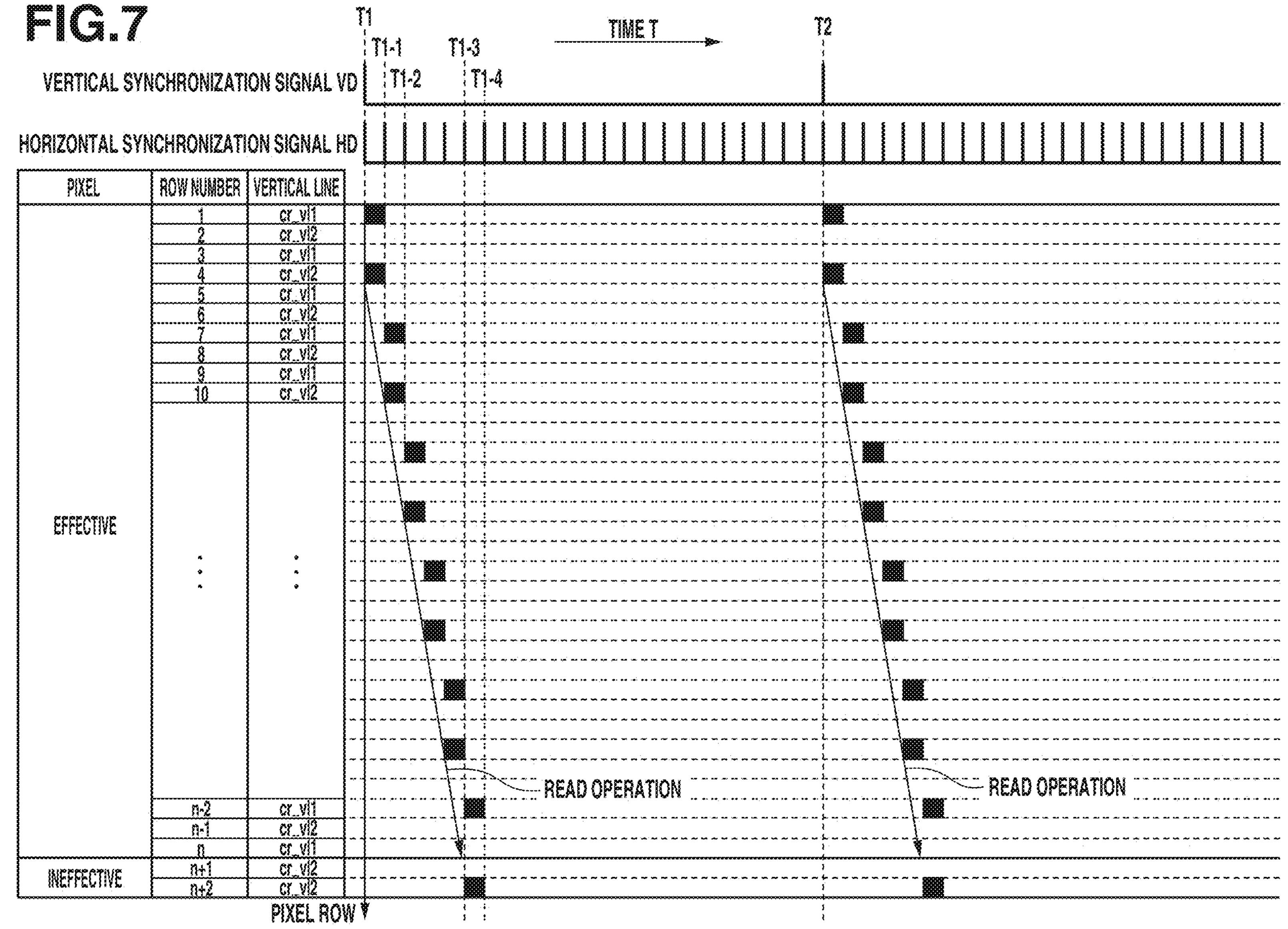
FIG. 7 is a timing chart illustrating an example of an operation according to the first exemplary embodiment.

FIG. 7 is a timing chart illustrating an operation example of the solid-state imaging device 1 according to the present exemplary embodiment. As the difference from the timing chart in FIG. 6, in the example in FIG. 6, all the rows are read one row by one row in the read operation performed through the scanning of each row, whereas in the example in FIG. 7, the read operation is performed by scanning every third row.

The read operation is started at time T1. During the period from time T1 to time T1−1, the charges of the PDs of the pixels P in the first and fourth rows are read. The pixel signals of the first row are read from the signal line cr_vl1, and the pixel signals of the fourth row are read from the signal line cr_vl2.

Next, during the period from time T1−1 to time T1−2, the charges of the PDs of the pixels P in the seventh and tenth rows are read respectively from the two signal lines arranged in each column. The pixel signals of the seventh row are read from the signal line cr_vl1, and the pixel signals of the tenth row are read from the signal line cr_vl2.

Subsequently, the read operation is sequentially performed on every third row in units of two rows at the timing of each horizontal synchronization signal HD until time T1−3.

During a period from time T1−3 to time T1−4, the pixel signals of the pixels P in the (n−2)-th row and the null pixels Q in the (n+2)-th row are read respectively from the two signal lines. The pixel signals of the (n−2)-th row are read from the signal line cr_vl1, and the pixel signals of the (n+2)-th row are read from the signal line cr_vl2.

In the example illustrated in FIG. 7, the null pixels Q are read from the (n+2)-th row, but they can also be read from the (n+1)-th row. In addition, the pixels to be additionally read do not necessarily have to be the null pixels Q and can be read from a unit pixel P, which is not used in reading. Even in the example in FIG. 7, null pixels are additionally read in reading the last row in the scanning area, allowing reading without causing a signal line to be floating, as in the example in FIG. 6.

Figure 8:
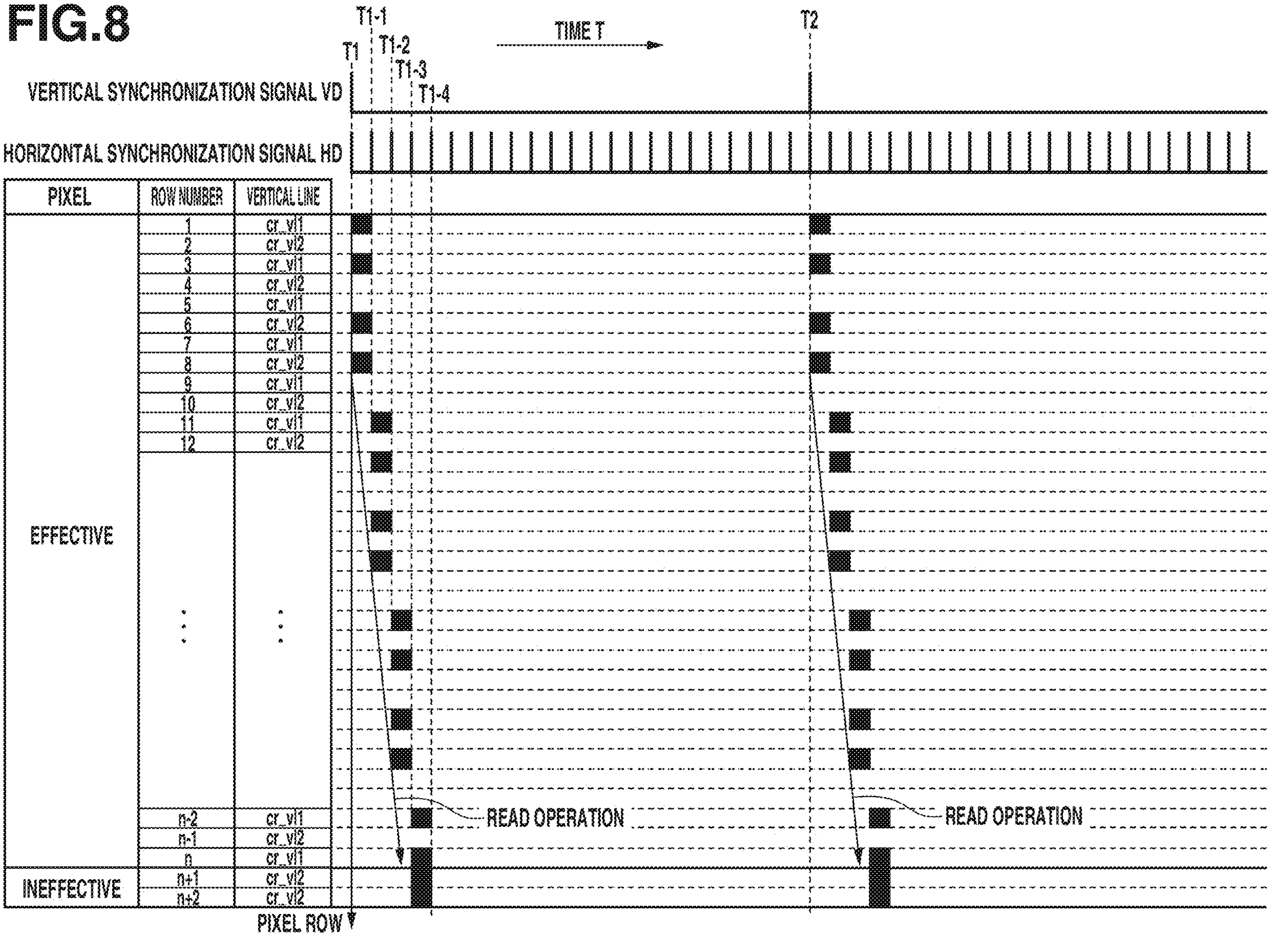
FIG. 8 is a timing chart illustrating an example of an operation according to the first exemplary embodiment.

FIG. 8 is a timing chart illustrating an operation example of the solid-state imaging device 1 according to the present exemplary embodiment. As the difference from the timing chart in FIG. 6, in the example in FIG. 6, all the rows are read one row by one row in the read operation performed through the scanning of each row, whereas in the example in FIG. 8, pixels are read in units of four pixels in ten rows every horizontal synchronization signal HD. In addition, in four pixels to be read simultaneously, two pixels are read using one signal line and the remaining two pixels are read using the other signal line.

The read operation is started at time T1. During the period from time T1 to time T1−1, the charges of the PDs of the pixels P in the first, third, sixth, and eighth rows are read. The pixel signals of the first and third rows are read from the signal line cr_vl1, and the pixel signals of the sixth and eighth rows are read from the signal line cr_vl2.

Subsequently, the read operation is performed sequentially in units of four pixels in ten rows in synchronization with the horizontal synchronization signals HD until time T1−3.

During the period from time T1−3 to time T1−4, the pixel signals from the pixels P in the (n−2)-th and n-th rows and from the null pixels Q in the (n+1)-th and (n+2)-th rows are read respectively from the two signal lines.

The pixel signals of the (n−2)-th and n-th rows are read from the signal line cr_vl1, and the pixel signals of the (n+1)-th and (n+2)-th rows are read from the signal line cr_vl2.

According to the present exemplary embodiment, the null pixels Q are read from the (n+1)-th and (n+2)-th rows, but they can be read from one of these two rows. The null pixels Q are read from two rows, the (n+1)-th row and the (n+2)-th row, and the numbers of pixels connected to the signal lines cr_vl1 and cr_vl2 are equalized, producing an effect of reducing the level difference between the signal lines cr_vl1 and cr_vl2.

In addition, pixels to be additionally read do not necessarily have to be null pixels Q and can be read from unit pixels P, which are not used in reading, as long as they are connected to the signal line cr_vl2.

Even in the example in FIG. 8, additionally reading null pixels in reading the last row in the scanning area allows reading without causing a vertical signal line to be floating, as in the example in FIG. 6.

Figure 9:
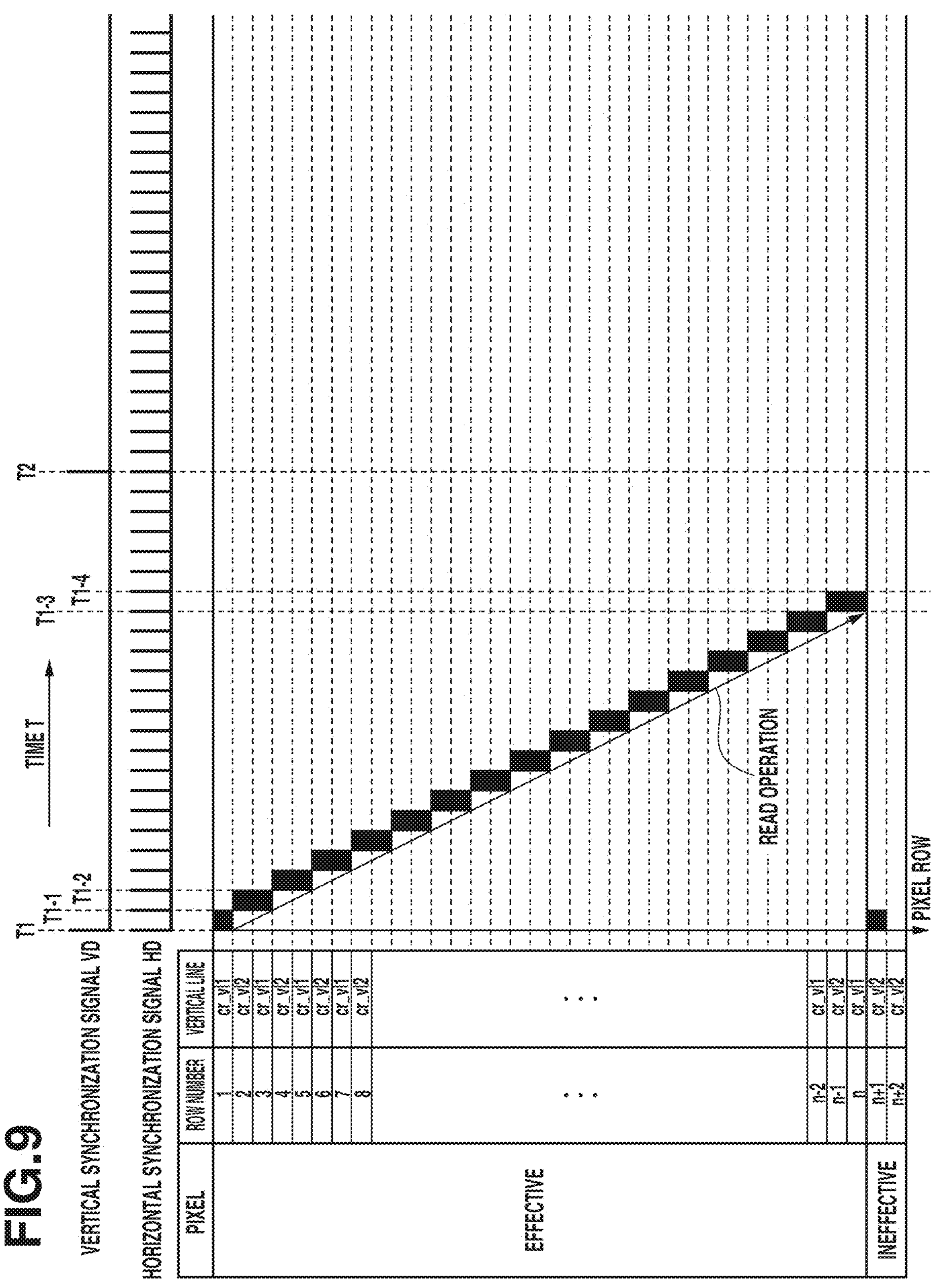
FIG. 9 is a timing chart illustrating an example of an operation according to the first exemplary embodiment.

FIG. 9 is a timing chart illustrating an operation example of the solid-state imaging device 1 according to the present exemplary embodiment. The difference from the example illustrated in FIG. 6 is a timing for avoiding a signal line from being floating in reading upper and lower ends of the scanning area.

In the example in FIG. 6, the signal line that is floating near the last row to be read in the scanning area is connected to the output of null pixels to be read. In contrast, in the example in FIG. 9, null pixels and unit pixels P in the scanning area are simultaneously read at a start of reading to avoid a signal line from being floating.

The read operation is started at time T. During the period from time T1 to time T1−1, the pixels P in the first row and the null pixels Q in the (n+1)-th row are read. The pixel signals of the first row are read from the signal line cr_vl1, and the pixel signals of the (n+1)-th row are read from the signal line cr_vl2. The null pixels in the (n+1)-th row read at this time can be the null pixels in the (n+2)-th row.

Next, during the period from time T1−1 to time T1−2, the charges of the PDs of the pixels P in the second and third rows are read respectively from the two signal lines arranged in each column. The pixel signals of the second row are read from the signal line cr_vl2, and the pixel signals of the third row are read from the signal line cr_vl1.

Subsequently, the read operation is sequentially performed by scanning two rows at a time in synchronization with the horizontal synchronization signals HD until time T1-4.

Even if null pixels are read in reading the leading row as in the example in FIG. 9, the reading can be performed without causing a signal line to be floating, as in the example in FIG. 6.

According to the present exemplary embodiment, the configuration in which each of the plurality of unit pixels P includes the selection transistor has been described, but the disclosure is not limited to this configuration. For example, the voltage for resetting the FD is made different between the pixels in a non-selected row and the pixels in a selected row. The reset voltage of the FD is applied to the pixels in the non-selected row so that the gate-source voltage of the amplification transistor is smaller than the threshold voltage of the amplification transistor. On the other hand, the reset voltage of the FD is applied to the pixels in the selected row so that the gate-source voltage of the amplification transistor is greater than the threshold voltage of the amplification transistor. In this way, even with a configuration without a selection transistor and with an amplification transistor directly connected to a signal line, selected and non-selected states of a plurality of unit pixels P can be changed. The present exemplary embodiment and the exemplary embodiments described below can be applied to the unit pixels P with this configuration.

A second exemplary embodiment will be described focusing on different points from the first exemplary embodiment. According to the present exemplary embodiment, each unit pixel P included in a first pixel region 105 includes two photoelectric conversion elements and two selection transistors connecting an FD and a signal line. Four signal lines 502 are provided to each column. Further, the vertical scanning unit and the driving method are different from those according to the first exemplary embodiment.

Figure 10:
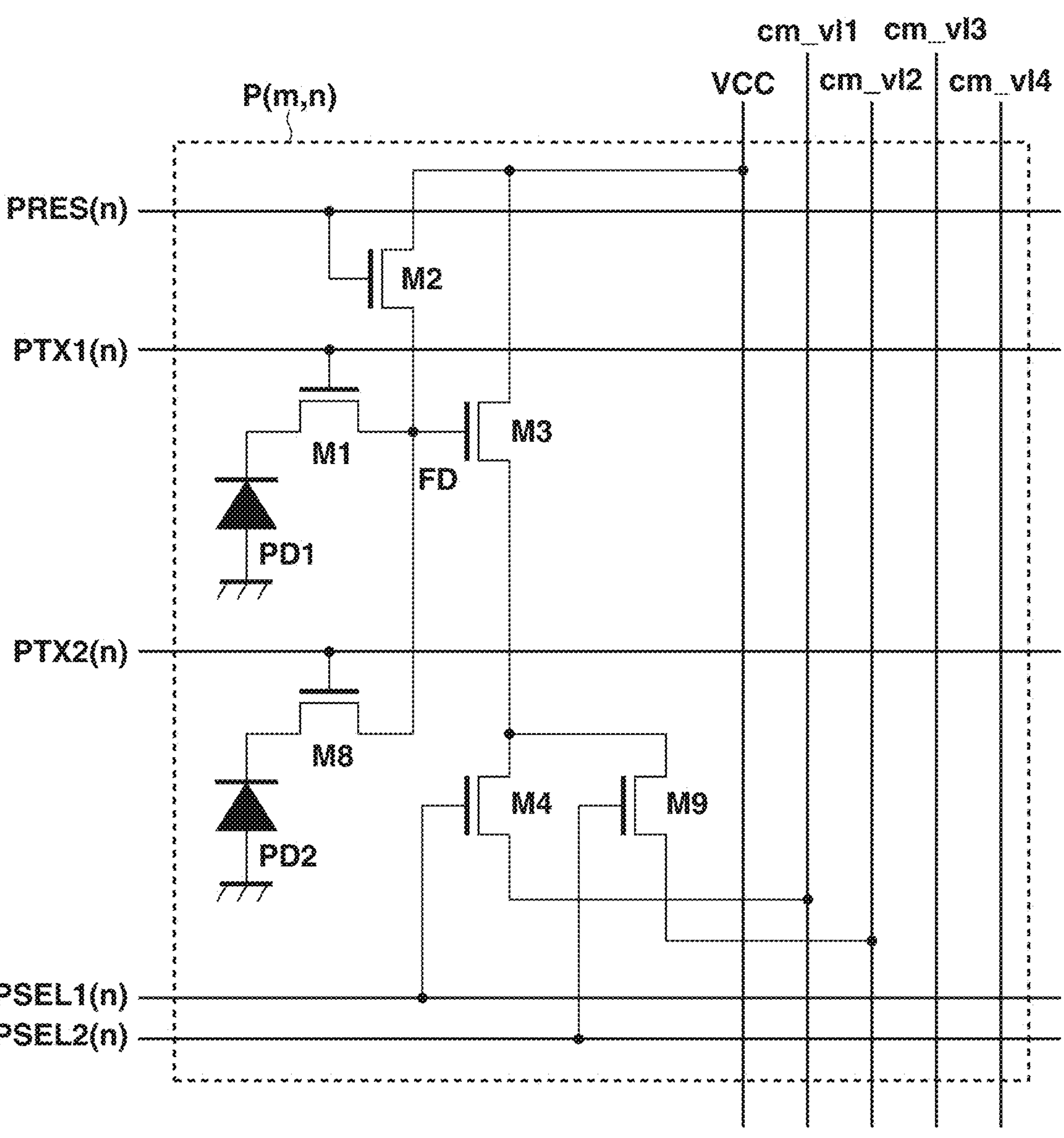
FIG. 10 illustrates an example of the configuration of a pixel according to a second exemplary embodiment.

FIG. 10 illustrates an example of the configuration of each unit pixel P arranged in the first pixel region 105 according to the present exemplary embodiment. Each unit pixel P includes two photoelectric conversion elements PD1 and PD2, the transfer transistors M1 and M8, a floating diffusion FD, the reset transistor M2, the amplification transistor M3, and the selection transistor M4 and M9.

The photoelectric conversion elements PD1 and PD2 include photoelectric conversion elements, such as photodiodes that generate a charge corresponding to an amount of incident light. The transfer transistors M1 and M8 are respectively connected between the photoelectric conversion elements PD1 and PD2 and the FD.

The photoelectric conversion elements PD1 in the m-th column are Gr pixels each equipped with a green color filter. The photoelectric conversion elements PD2 in the m-th column are R pixels each equipped with a red color filter. The photoelectric conversion elements PD1 in the (m+1)-th column are B pixels each equipped with a blue color filter, and the photoelectric conversion elements PD2 are Gb pixels (not illustrated) each equipped with a green color filter. In other words, a Bayer array is formed in the m-th and (m+1)-th columns of the n-th row. This configuration is an example, and a pixel does not necessarily have to be equipped with a color filter and can have a configuration without a color filter depending on an application.

Figure 11:
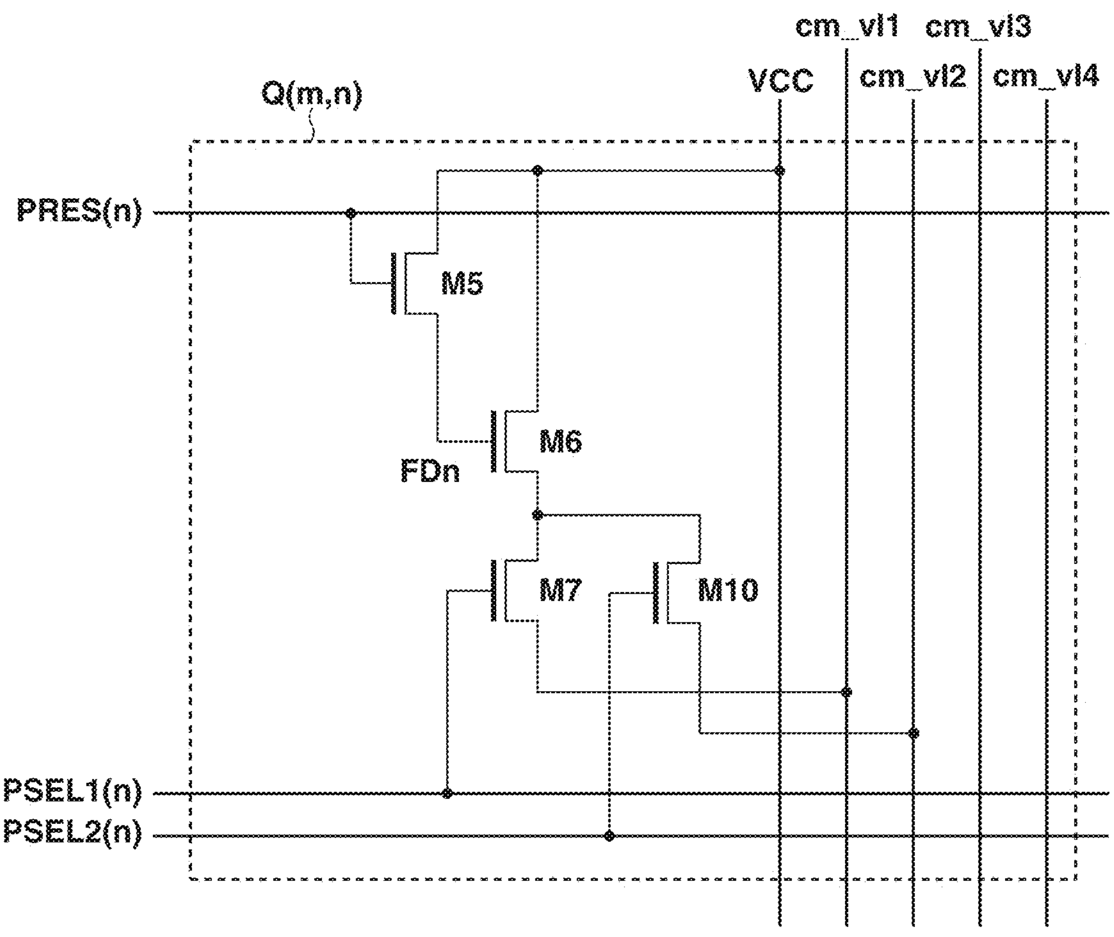
FIG. 11 illustrates an example of the configuration of a pixel according to the second exemplary embodiment.

FIG. 11 illustrates an example of the configuration of each null pixel Q arranged in a second pixel region 106.

As the difference from a null pixel Q described in the first exemplary embodiment, each null pixel Q according to the present exemplary embodiment includes two selection transistors. However, this is not an essential configuration, and a null pixel Q can include one selection transistor as in the first exemplary embodiment.

Figure 12:
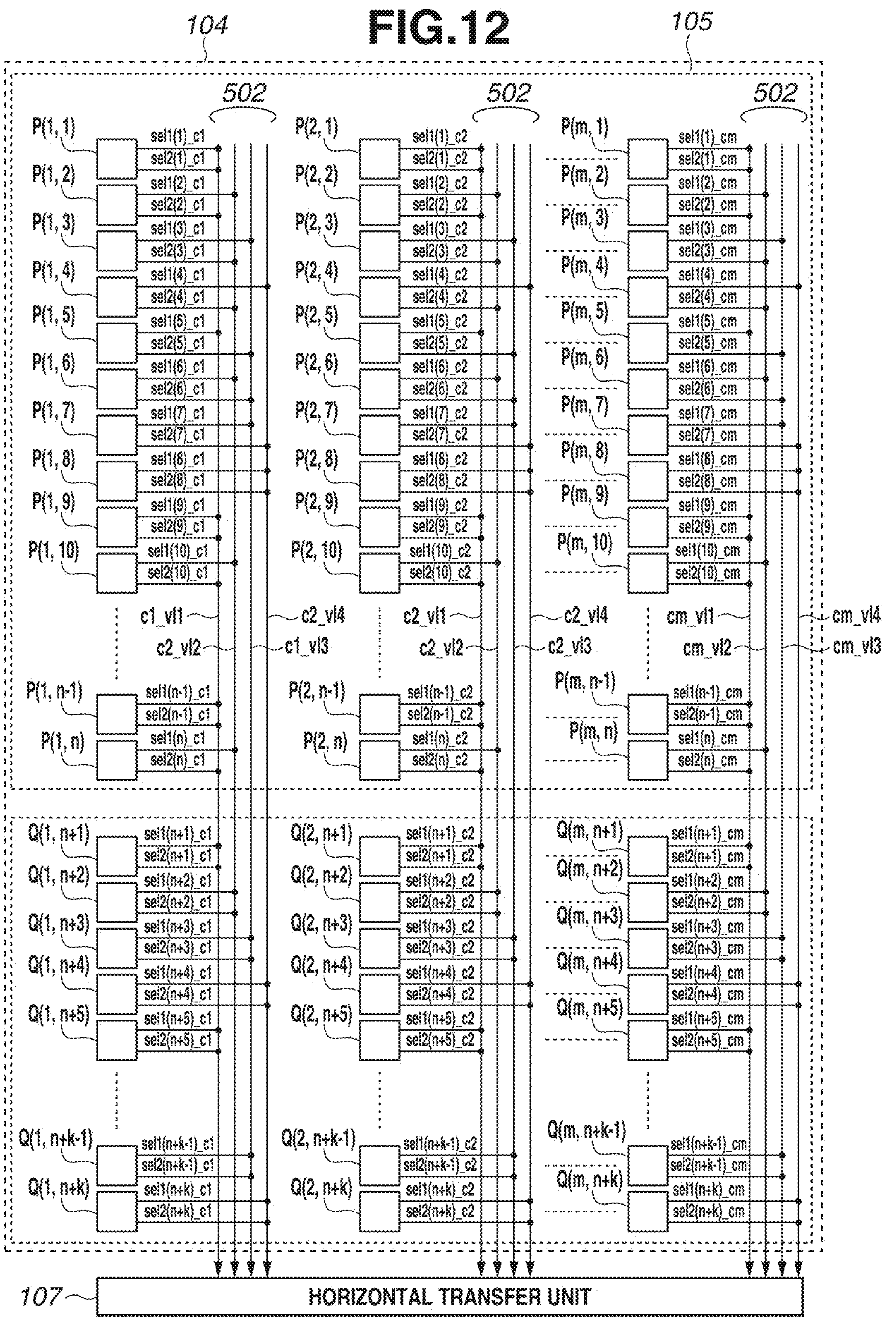
FIG. 12 is a schematic diagram illustrating an example of the configuration of a pixel area and a horizontal transfer unit according to the second exemplary embodiment.

FIG. 12 is a schematic diagram illustrating an example of the configuration of a pixel area and a horizontal transfer unit according to the present exemplary embodiment. As the difference from the configuration described in the first exemplary embodiment, four signal lines 502 are arranged in each column across the first pixel region 105 and the second pixel region 106.

The connection between a pixel signal sel1(*s*)_cr and a signal line cr_vl #(#: 1 to 4) of each row in the first pixel region 105 is different from that in the first exemplary embodiment in that the pixel signal sel1(*s*)_cr and the signal line cr_vl #(#: 1 to 2) are connected at a cycle of four rows instead of a cycle of two rows.

Further, according to the present exemplary embodiment, signal lines cr_vl1, cr_vl2, cr_vl3, and cr_vl4 are connected in row order, but the connection order is not necessarily required, and the signal lines can be connected in a desired order as appropriate.

A signal line sel2(*s*)_cr and the signal line cr_vl #(#: 1 to 4) in each row in the first pixel region 105 are connected in a cycle of eight rows.

In other words, the pixel P(r, 1) in the first row is connected to the signal line cr_vl1 via a signal line sel2(1)_r. The pixel P(r, 2) in the second row is connected to the signal line cr_vl1 via a signal line sel2(2)_r. The pixel P(r, 3) in the third row is connected to the signal line cr_vl2 via a signal line sel2(3)_r. The pixel P(r, 4) in the fourth row is connected to the signal line cr_vl2 via a signal line sel2(4)_r. The pixel P(r, 5) in the fifth row is connected to the signal line cr_vl3 via a signal line sel2(5)_r. The pixel P(r, 6) in the sixth row is connected to the signal line cr_vl3 via a signal line sel2(6)_r. The pixel P(r, 7) in the seventh row is connected to the signal line cr_vl4 via a signal line sel2(7)_r. The pixel P(r, 8) in the eighth row is connected to the signal line cr_vl4 via a signal line sel2(8)_r.

Thereafter, from the ninth to n-th rows, the pixels are similarly connected to the signal lines in a cycle of eight rows. This connection is an example, and the pixels can be connected in a desired cycle as appropriate.

According to the first exemplary embodiment, of the two signal lines 502, the null pixels are connected to the signal line cr_vl2 that can be floating in reading a pixel at an end of the scanning area. On the other hand, according to the present exemplary embodiment, of the four signal lines, the null pixels are connected to all the four signal lines cr_vl1 to cr_vl4 that can be floating in each column.

In other words, the null pixel Q(r, n+1) in the (n+1)-th row is connected to the signal line cr_vl1 via signal lines sel1(*n*+1)_r and sel2(*n*+1)_r. The null pixel Q(r, n+2) in the (n+2)-th row is connected to the signal line cr_vl2 via the signal lines sel1(*n*+2)_r and sel2(*n*+2)_r.

The null pixel Q(r, n+3) in the (n+3)-th row is connected to the signal line cr_vl3 via the signal lines sel1(*n*+3)_r and sel2(*n*+3)_r. Further, the null pixel Q(r, n+4) in the (n+4)-th row is connected to the signal line cr_vl4 via the signal lines sel1(*n*+4)_r and sel2(*n*+4)_r.

Thereafter, from the (n+4)-th to (n+k)-th rows, the pixels are similarly connected to the signal lines in a cycle of eight rows. This connection is an example and does not necessarily have to be in a cycle of eight rows, and the pixels can be connected in a desired cycle as appropriate.

In addition, it is not necessary to connect the null pixels to all the four signal lines cr_vl1 to cr_vl4 in each column.

It is sufficient that any signal line that can be floating in reading is connected to a null pixel.

Figure 13:
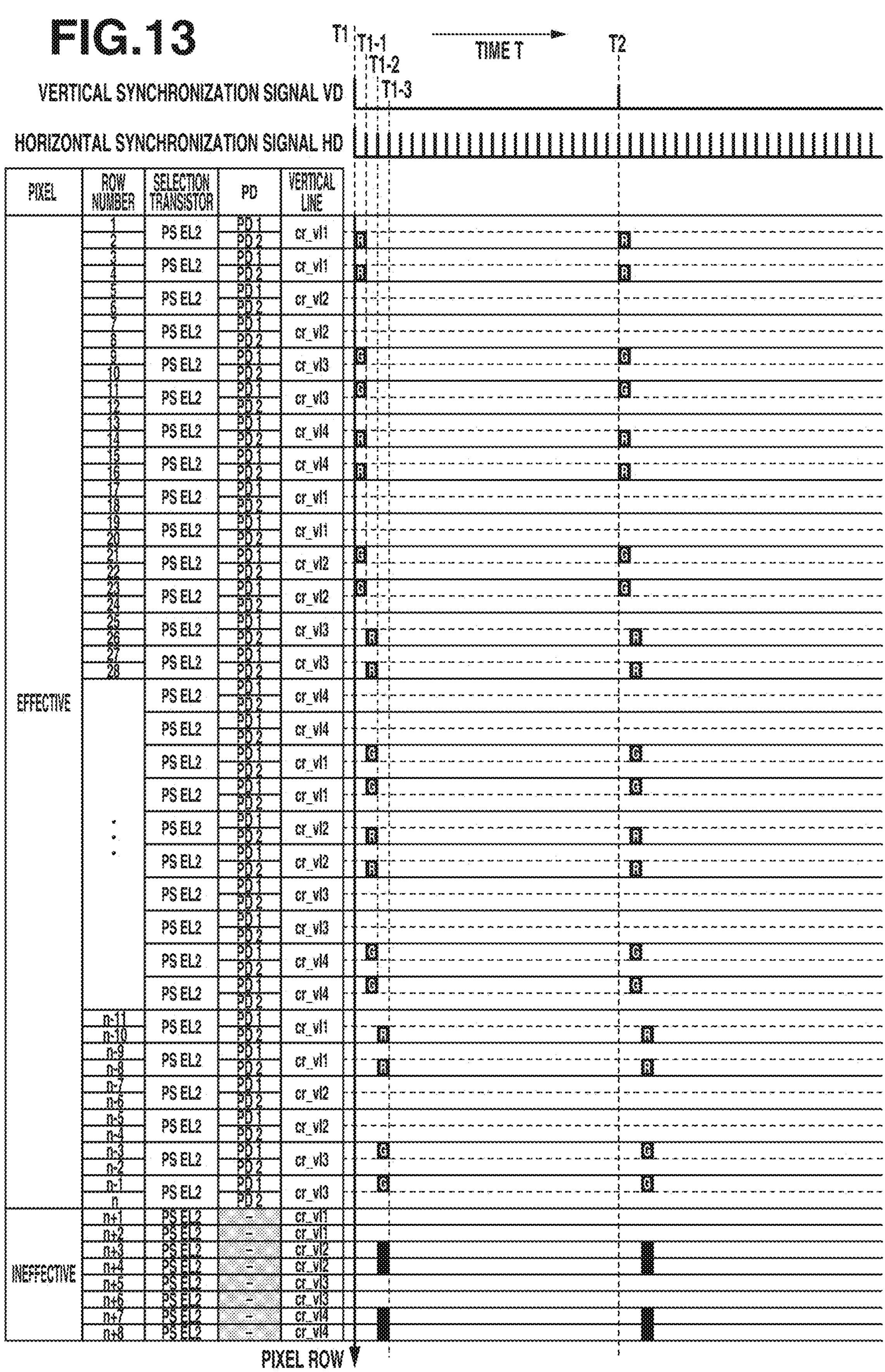
FIG. 13 is a timing chart illustrating an example of an operation according to the second exemplary embodiment.

FIG. 13 is a timing chart illustrating an operation example of the solid-state imaging device according to the present exemplary embodiment.

As the difference from the first exemplary embodiment, reading is performed using all the four signal lines arranged in each column in the scanning area.

The read operation is started at time T1 and is sequentially performed in units of four pixels in 12 rows in individual colors of a Bayer array every horizontal synchronization signal HD during the period from time T1 to time T1−2 in synchronization with the horizontal synchronization signal HD.

During the period from time T1-2 to time T1−3, the pixel signals of the pixels P in the (n−10)-th, (n−8)-th, (n−3)-th, and (n−1)-th rows and of the null pixels Q in the (n+3)-th, (n+4)-th, (n+7)-th, and (n+8)-th rows are read from the four signal lines, respectively.

In other words, pixel signals of the (n−10)-th and (n−8)-th rows are read from the signal line cr_vl1. Pixel signals of the (n−3)-th and (n−1)-th rows are read from the signal line cr_vl3.

Pixel signals of the (n+3)-th and (n+4)-th rows are read from the signal line cr_vl2. Pixel signals of the (n+7)-th and (n+8)-th rows are read from the signal line cr_vl4.

According to the present exemplary embodiment, the null pixels Q are read from the four rows, namely the (n+3)-th, (n+4)-th, (n+7)-th, and (n+8)-th rows, but it is sufficient that at least one null pixel is connected to each of the signal lines cr_vl2 and cr_vl4. Each signal line is assigned to the null pixels in two rows to read, allowing the number of pixels connected to each of the signal lines cr_vl1 to cr_vl4 in each column to be equalized, producing an effect of reducing the level difference in signals among the signal lines cr_vl1 and cr_vl4.

In addition, a pixel to be additionally read does not necessarily have to be a null pixel Q. An effective pixel which is not used in reading can be read as long as the effective pixel is connected to the signal lines cr_vl2 and cr_vl4.

According to the present exemplary embodiment, the example is described in which reading from the FDs of each pixel P and each null pixel Q is always performed using the selection transistors M9 and M10 during one vertical synchronization signal (VD) period, but this configuration is not necessarily used. In other words, the selection transistor to be used every horizontal synchronization signal HD can be the selection transistor M4 or M9 in a pixel P and the selection transistor M7 or M10 in a null pixel Q, and can be appropriately changed by switching the control of the vertical scanning unit 103 according to a thinned row in vertically reading.

According to the present exemplary embodiment, reading a null pixel additionally prevents a signal line from being floating in reading.

Figure 14A:
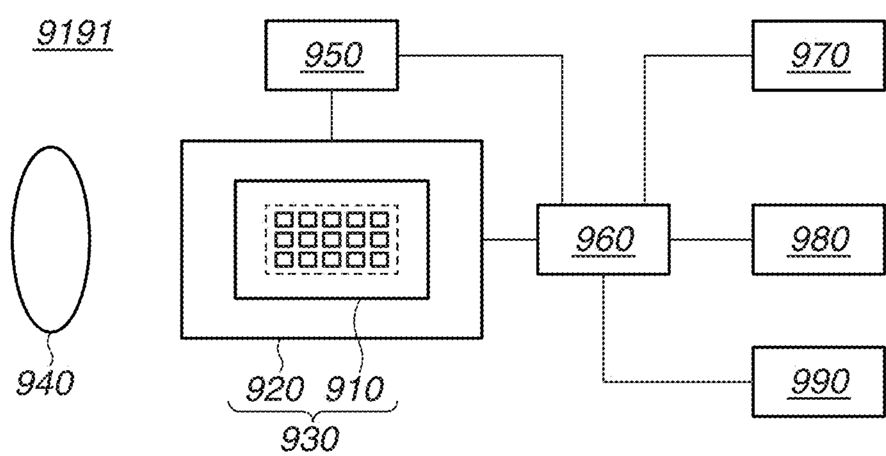
FIGS. 14A, 14B, and 14C are schematic diagrams illustrating configurations of devices according to a third exemplary embodiment.

A third exemplary embodiment will be described. The third exemplary embodiment can be applied to both of the first and second exemplary embodiments. FIG. 14A is a schematic diagram illustrating a device 9191 provided with a semiconductor device 930 according to the present exemplary embodiment. The photoelectric conversion apparatus according to each of the above-described exemplary embodiments can be used in the semiconductor device 930.

The device 9191 provided with the semiconductor device 930 will be described in detail. The semiconductor device 930 can include a semiconductor device 910 and a package 920 that accommodates the semiconductor device 910 as described above. The package 920 can include a base to which the semiconductor device 910 is fixed and a lid made of, for example, glass, facing the semiconductor device 910. The package 920 can further include a bonding member, such as a bonding wire and a bump that connects a terminal provided on the base and a terminal provided on the semiconductor device 910.

The device 9191 can include at least any one of an optical apparatus 940, a control apparatus 950, a processing apparatus 960, a display apparatus 970, a storage apparatus 980, and a mechanical apparatus 990. The optical apparatus 940 is used for the semiconductor device 930. The optical apparatus 940 is, for example, a lens, a shutter, or a mirror, and includes an optical system that guides light to the semiconductor device 930. The control apparatus 950 controls the semiconductor device 930. The control apparatus 950 is, for example, a semiconductor device, such as an application specific integrated circuit (ASIC).

The processing apparatus 960 processes signals output from the semiconductor device 930. The processing apparatus 960 is a semiconductor device, such as a CPU or an ASIC included in an analog front end (AFE) or a digital front end (DFE). The display apparatus 970 is an electroluminescence (EL) display apparatus or a liquid crystal display apparatus that displays information (image) acquired by the semiconductor device 930. The storage apparatus 980 is a magnetic device or a semiconductor device that stores information (image) acquired by the semiconductor device 930. The storage apparatus 980 is a volatile memory, such as a static random access memory (SRAM) or a dynamic random access memory (DRAM), or a nonvolatile memory, such as a flash memory or a hard disk drive.

The mechanical apparatus 990 includes a moving unit or a propulsion unit, such as a motor or an engine. The device 9191 displays signals output from the semiconductor device 930 on the display apparatus 970 and transmits the signals to the outside using a communication apparatus (not illustrated) provided in the device 9191. Thus, the device 9191, in one embodiment, further includes the storage apparatus 980 and the processing apparatus 960 separately from the storage circuitry and arithmetic circuitry included in the semiconductor device 930. The mechanical apparatus 990 can be controlled based on signals output from the semiconductor device 930.

Further, the device 9191 is suitable for electronic devices, such as an information terminal having an imaging function (for example, a smartphone and a wearable terminal) and a camera (for example, an interchangeable lens camera, a compact camera, a video camera, and a monitoring camera). The mechanical apparatus 990 in a camera can drive components of the optical apparatus 940 in zooming, focusing, and shutter operations. Further, the mechanical apparatus 990 in a camera can move the semiconductor device 930 for an anti-vibration operation.

Further, the device 9191 can be a transport device, such as a vehicle, a ship, or a flying vehicle (a drone, an aircraft, or the like). The mechanical apparatus 990 as a transport device can be used as a mobile apparatus. The device 9191 as a transport device is suitable for transporting the semiconductor device 930 and for assisting and/or automating driving (operation) using the imaging function. The processing apparatus 960 for assisting and/or automating driving (operation) can perform processing for operating the mechanical apparatus 990 as a mobile apparatus based on information acquired by the semiconductor device 930. Furthermore, the device 9191 can be a medical device, such as an endoscope, a measurement device, such as a ranging sensor, an analytical device, such as an electron microscope, office equipment, such as a copy machine, or industrial equipment, such as a robot.

According to the above-described exemplary embodiment, it is possible to acquire a good pixel characteristic. This makes it possible to increase the value of the semiconductor device 930. Increasing the value described here includes at least any one of the addition of functions, the improvement of performance, the improvement of characteristics, the improvement of reliability, the improvement of manufacturing yield, the reduction of environmental burdens, cost reduction, miniaturization, and weight reduction.

Thus, the semiconductor device 930 according to the present exemplary embodiment used in the device 9191 improves the value of the device 9191. For example, the semiconductor device 930 mounted on a transport device provides excellent performance in imaging the outside of the transport device or measuring the external environment. Thus, the decision to mount a semiconductor device according to the present exemplary embodiment on a transport device is advantageous in improving the performance of the transport device itself in manufacturing and selling the transport device. Particularly, the semiconductor device 930 is suitable for a transport device that performs operation support and/or automatic operation of the transport device itself using information acquired by the semiconductor device 930.

A photoelectric conversion system and a mobile body according to the present exemplary embodiment will be described with reference to FIGS. 14B and 14C.

Figure 14B:
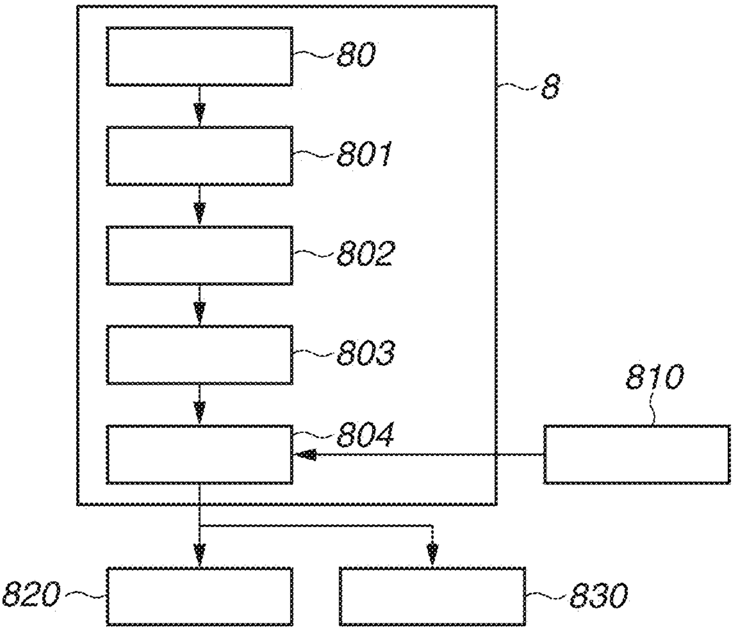
Figure 14C:
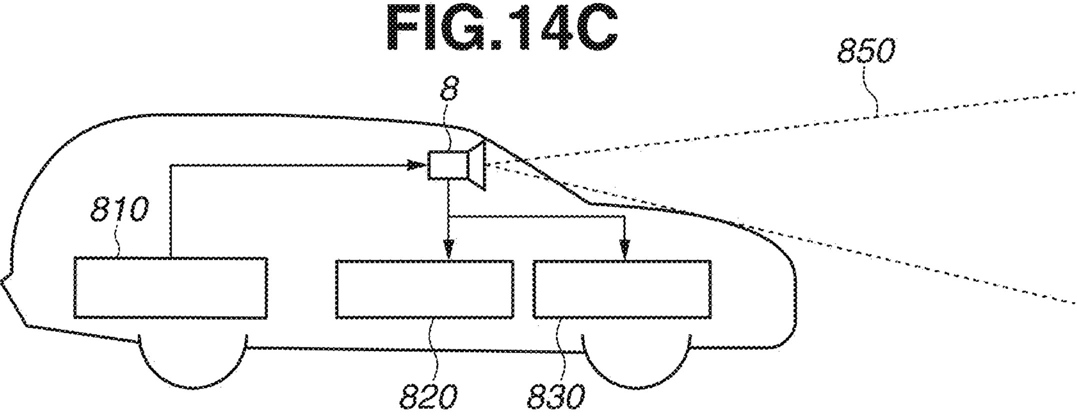

FIG. 14B illustrates an example of the photoelectric conversion system related to an in-vehicle camera. A photoelectric conversion system 8 includes a photoelectric conversion apparatus 80. The photoelectric conversion apparatus 80 is a photoelectric conversion apparatus (imaging device) described in any of the above-described exemplary embodiments. The photoelectric conversion system 8 includes an image processing unit 801 that performs image processing on a plurality of pieces of image data acquired by the photoelectric conversion apparatus 80 and a parallax acquisition unit 802 that calculates a parallax (a phase difference of parallax images) from the plurality of pieces of image data acquired by the photoelectric conversion system 8.

The photoelectric conversion system 8 can include an optical system (not illustrated) that guides light to the photoelectric conversion apparatus 80, such as a lens, a shutter, or a mirror. Further, a plurality of photoelectric conversion units that is approximately conjugate to the pupil of the optical system can be arranged in a pixel included in the photoelectric conversion apparatus 80. For example, the plurality of photoelectric conversion units that is approximately conjugate to the pupil is arranged corresponding to a single microlens. The plurality of photoelectric conversion units receives light beams passing through different positions of the pupil of the optical system, so that the photoelectric conversion apparatus 80 outputs image data corresponding to the light beams passing through the different positions. Then, the parallax acquisition unit 802 can calculate a parallax using the output image data.

The photoelectric conversion system 8 further includes a distance acquisition unit 803 that calculates the distance to a target object based on the calculated parallax and a collision determination unit 804 that determines whether there is a possibility of a collision based on the calculated distance. The parallax acquisition unit 802 and the distance acquisition unit 803 are examples of distance information acquisition units that acquire information on the distance to a target object. Specifically, the distance information is information regarding a parallax, a defocus amount, and the distance to a target object. The collision determination unit 804 can use any of the pieces of the distance information to determine the possibility of a collision. The distance information can be acquired using TOF.

The distance information acquisition unit can be implemented with specially designed hardware or a software module. The distance information acquisition unit can also be implemented using a field programmable gate array (FPGA), an ASIC, or a combination thereof.

The photoelectric conversion system 8 is connected to a vehicle information acquisition apparatus 810 and can acquire vehicle information, such as a vehicle speed, a yaw rate, and a steering angle. The photoelectric conversion system 8 is also connected to a control engine control unit (ECU) 820 that is a control apparatus that outputs a control signal for generating a braking force applied to the vehicle based on a determination result by the collision determination unit 804. The photoelectric conversion system 8 is also connected to an alarm apparatus 830 that issues an alarm to a driver based on the determination result by the collision determination unit 804.

For example, if the collision determination unit 804 determines that there is a high possibility of a collision, the control ECU 820 performs a vehicle control to avoid the collision and reduce damage by applying a brake, releasing an accelerator, or reducing an engine output. The alarm apparatus 830 issues an alarm to a user by sounding an alarm, displaying alarm information on a screen of a car navigation system or the like, or vibrating a seat belt or a steering wheel.

According to the present exemplary embodiment, the photoelectric conversion system 8 captures an image surrounding the vehicle, for example, in front of or behind the vehicle. FIG. 14C illustrates the photoelectric conversion system 8 to capture images in front of the vehicle (an imaging range 850). The vehicle information acquisition apparatus 810 transmits instructions to the photoelectric conversion system 8 or the photoelectric conversion apparatus 80. This configuration provides higher accurate distance measurement.

The example has been described of controlling a vehicle to avoid a collision with another vehicle, but the disclosure can also be applied to control to automatically drive a vehicle following another vehicle, or control to automatically drive a vehicle to prevent the vehicle from running out of a lane. Further, the photoelectric conversion system 8 can be applied to not only a vehicle, such as an automobile, but also, for example, a mobile body (mobile apparatus), such as a ship, an aircraft, or an industrial robot. The mobile body includes a driving force generation unit that generates a driving force mainly used to move the mobile body and/or a rotating body that is mainly used to move the mobile body. The driving force generation unit can be an engine or a motor. The rotating body can be a tire, a wheel, a screw of a ship, and a propeller of an aircraft. In addition, the photoelectric conversion system 8 can be applied to not only the mobile body but also a device that widely uses object recognition, such as intelligent transport systems (ITS).

In the present specification, expressions, such as "A or B", "at least one of A and B", "at least one of A and/or B", and "one or more of A and/or B", can include all possible combinations of listed items, unless explicitly defined otherwise. Specifically, the above-described expressions are understood to describe all cases where at least one A is included, where at least one B is included, and where both at least one A and at least one B are included. This understanding is equally applied to combinations of three or more elements.

Other Embodiments

The exemplary embodiments described above are merely examples for implementing the disclosure, so that the technical scope of the disclosure should not be construed as being limited thereby. In other words, the disclosure can be implemented in various forms without departing from the technical idea or the main features thereof. For example, combinations of elements in each of the above-described exemplary embodiments are also within the scope of the disclosure.

Further, each of the above-described exemplary embodiments can be appropriately modified within the scope not departing from the technical idea. The disclosure of the present specification includes not only what is described in the present specification but also all matters that can be understood from the present specification and the drawings attached thereto.

According to at least one of the exemplary embodiments of the disclosure, a photoelectric conversion apparatus with improved image quality can be provided.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-145294, filed Sep. 7, 2023, which is hereby incorporated by reference herein in its entirety.

What is claimed is:

1. A photoelectric conversion apparatus comprising:

a plurality of pixels arranged in an array and having a scanning area to be sequentially scanned in a predetermined direction, the array including a plurality of pixel columns and a plurality of pixel rows in which the plurality of pixels are arranged;

a plurality of signal lines each configured to extend in a column direction in which the plurality of pixel columns is arranged, wherein each of the plurality of pixel columns is provided with any of the plurality of signal lines; and a scanning circuit configured to scan the plurality of pixels, wherein the scanning circuit performs scanning to connect two or more pixels arranged in a predetermined number of pixel rows, the predetermined number of which is two or more, among the plurality of pixels rows to one of the plurality of signal lines in parallel during a scanning period in which the scanning area is scanned, wherein the scanning circuit performs reading a first pixel row group having a first number of pixel rows among the plurality of pixel rows in the scanning area during a first period included in the scanning period, and wherein the scanning circuit performs reading a second pixel row group having a second number of rows, which is less than the first number of pixel rows, among the plurality of pixel rows and a third pixel row group having a third number of rows, which is less than the first number of rows, among the plurality of pixel rows in parallel in the scanning area during a second period in which a first or last scan is performed in the scanning period.

2. The photoelectric conversion apparatus according to claim 1, wherein the plurality of pixels includes a first pixel region including a first pixel that includes a photoelectric conversion element and outputs a signal corresponding to incident light and a second pixel region including a second pixel that outputs a signal indicating a predetermined value.

3. The photoelectric conversion apparatus according to claim 2, wherein the scanning area is included in the first pixel region.

4. The photoelectric conversion apparatus according to claim 2, wherein the third pixel row group is included in the first pixel region.

5. The photoelectric conversion apparatus according to claim 2, wherein the third pixel row group is included in the second pixel region.

6. The photoelectric conversion apparatus according to claim 2, wherein the first pixel further includes a floating diffusion, and wherein the floating diffusion is connected to a plurality of the photoelectric conversion elements.

7. The photoelectric conversion apparatus according to claim 1, wherein a pixel row is present between the second pixel row group and the third pixel row group.

8. The photoelectric conversion apparatus according to claim 1, wherein a number of pixels connected to one of the plurality of signal lines is equal to a number of pixels connected to any other one of the plurality of signal lines.

9. The photoelectric conversion apparatus according to claim 1, wherein the scanning by the scanning circuit is scanning for connecting all of the signal lines which are, among the plurality of signal lines, provided in one pixel column to the two or more pixels in parallel.

10. The photoelectric conversion apparatus according to claim 1, wherein each of the plurality of pixels includes a selection transistor, and wherein the scanning by the scanning circuit is scanning for connecting the selection transistors of the two or more pixels arranged in the plurality of pixel rows as the predetermined number of pixel rows to one of the plurality of signal lines in parallel.

11. The photoelectric conversion apparatus according to claim 10, wherein the scanning by the scanning circuit is scanning for connecting each of all signal lines which are, among the plurality of signal lines, provided in one pixel column to any of the selection transistors of the two or more pixels in parallel.

12. A device provided with the photoelectric conversion apparatus according to claim 1, the device comprising at least any one of:

an optical apparatus used for the photoelectric conversion apparatus;

a control apparatus configured to control the photoelectric conversion apparatus;

a processing apparatus configured to process a signal output from the photoelectric conversion apparatus;

a display apparatus configured to display information acquired by the photoelectric conversion apparatus;

a storage apparatus configured to store information acquired by the photoelectric conversion apparatus; and a mechanical apparatus configured to operate based on information acquired by the photoelectric conversion apparatus.

13. A method for processing a signal in a photoelectric conversion apparatus that includes a plurality of pixels arranged in an array and having a scanning area to be sequentially scanned in a predetermined direction, the array including a plurality of pixel columns and a plurality of pixel rows in which the plurality of pixels are arranged;

a plurality of signal lines each configure to extend in a column direction in which the plurality of pixel columns is arranged, wherein each of the plurality of pixel columns is provided with any of the plurality of signal lines and a scanning circuit configured to scan the plurality of pixels, and for scanning to connect two or more pixels arranged in a predetermined number of pixel rows, the predetermined number of which is two or more, among the plurality of pixel rows to one of the plurality of signal lines in parallel during a scanning period in which the scanning area is scanned, the method comprising:

performing reading a first pixel row group having a first number of rows among the plurality of pixel rows in the scanning area during a first period for scanning the scanning area; and performing reading a second pixel row group having a second number of pixel rows, which is less than the first number of pixel rows, among the plurality of pixel rows and a third pixel row group having a third number of pixel rows, which is less than the first number of pixel rows in parallel in the scanning area during a second period in which a first or last scan is performed in the scanning period.

14. The method according to claim 13, wherein the scanning by the scanning circuit is scanning for connecting all signal lines which are, among the plurality of signal lines, provided in one pixel column to the two or more pixels in parallel.

15. The method according to claim 14, wherein the plurality of pixels includes a first pixel region including a first pixel that includes a photoelectric conversion element and outputs a signal corresponding to incident light and a second pixel region including a second pixel that outputs a signal indicating a predetermined value.

16. The method according to claim 15, wherein the third pixel row group is included in the first pixel region or in the second pixel region.

17. The method according to claim 15, wherein the first pixel further includes a floating diffusion, and wherein the floating diffusion is connected to a plurality of the photoelectric conversion elements.

18. The method according to claim 14, wherein a pixel row is present between the second pixel row group and the third pixel row group.

19. The method according to claim 14, wherein a number of pixels connected to one of the plurality of signal lines is equal to a number of pixels connected to any other one of the plurality of signal lines.

20. The method according to claim 14, wherein each of the plurality of pixels includes a selection transistor, and wherein the scanning by the scanning circuit is scanning for connecting the selection transistors of the two or more pixels arranged in the plurality of pixel rows as the predetermined number of rows to one of the plurality of signal lines in parallel.

* * * * *